United States Patent
Mohler (10) Patent No.: US 9,253,306 B2
(45) Date of Patent: Feb. 2, 2016

(54) DEVICE SKINS FOR USER ROLE, CONTEXT, AND FUNCTION AND SUPPORTING SYSTEM MASHUPS

(75) Inventor: David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 335 days.

(21) Appl. No.: 12/837,791

(22) Filed: Jul. 16, 2010

(65) Prior Publication Data

US 2011/0209069 A1 Aug. 25, 2011

Related U.S. Application Data

(60) Provisional application No. 61/307,134, filed on Feb. 23, 2010.

(51) Int. Cl.
| | |
|---|---|
| *G06F 3/00* | (2006.01) |
| *H04M 1/725* | (2006.01) |
| *H04L 29/08* | (2006.01) |
| *H04W 4/00* | (2009.01) |
| *H04W 64/00* | (2009.01) |

(52) U.S. Cl.
CPC ........... *H04M 1/72569* (2013.01); *H04L 67/18* (2013.01); *H04L 67/22* (2013.01); *H04L 67/24* (2013.01); *H04M 1/72572* (2013.01); *H04M 1/72566* (2013.01); *H04W 4/00* (2013.01); *H04W 64/00* (2013.01)

(58) Field of Classification Search
CPC ........................... H04M 1/72569; H04L 67/24
See application file for complete search history.

(56) References Cited

U.S. PATENT DOCUMENTS

| | | | |
|---|---|---|---|
| 2003/0148773 A1 | 8/2003 | Spriestersbach et al. | |
| 2005/0132009 A1* | 6/2005 | Solie | 709/206 |
| 2006/0252417 A1* | 11/2006 | Abramson et al. | 455/422.1 |
| 2008/0077865 A1 | 3/2008 | Hiles et al. | |
| 2008/0291325 A1 | 11/2008 | Teegan et al. | |
| 2009/0053997 A1 | 2/2009 | Jobling et al. | |
| 2009/0147937 A1 | 6/2009 | Sullhan et al. | |
| 2009/0210481 A1* | 8/2009 | Fletcher et al. | 709/203 |
| 2009/0287740 A1 | 11/2009 | Banerjee et al. | |
| 2009/0312033 A1 | 12/2009 | Shen et al. | |
| 2010/0080368 A1 | 4/2010 | Erhart et al. | |

(Continued)

FOREIGN PATENT DOCUMENTS

| | | |
|---|---|---|
| CN | 1353822 | 6/2002 |
| CN | 101316399 | 12/2008 |

(Continued)

OTHER PUBLICATIONS

Sur et al., "SOA based Context Aware Service Infrastructure—An approach to enable Telecom Service Provider Transformation in a Web 2.0 Environment," IEEE International Conference on Services Computing, 2007, 2 pages.

(Continued)

*Primary Examiner* — Scott Baderman
*Assistant Examiner* — Asher Kells
(74) *Attorney, Agent, or Firm* — Sheridan Ross P.C.

(57) ABSTRACT

Embodiments of the present invention are directed to a communication system that provides various automated operations, including searches of public and private resources for third party information and presentation of the located third party information by a mashup and preparation of a mashup to combine different communication modes or modes in a common session.

20 Claims, 4 Drawing Sheets

(56) References Cited

U.S. PATENT DOCUMENTS

| | | |
|---|---|---|
| 2010/0246571 A1 | 9/2010 | Geppert et al. |
| 2010/0246800 A1 | 9/2010 | Geppert et al. |
| 2010/0251119 A1 | 9/2010 | Geppert et al. |
| 2010/0251124 A1 | 9/2010 | Geppert et al. |
| 2010/0251127 A1 | 9/2010 | Geppert et al. |
| 2010/0251142 A1 | 9/2010 | Geppert et al. |
| 2010/0251158 A1 | 9/2010 | Geppert et al. |
| 2010/0251177 A1 | 9/2010 | Geppert et al. |
| 2010/0293543 A1 | 11/2010 | Erhart et al. |
| 2010/0318619 A1* | 12/2010 | Meijer .................. 709/206 |
| 2011/0072492 A1 | 3/2011 | Mohler et al. |
| 2011/0113470 A1 | 5/2011 | Ma et al. |
| 2011/0161409 A1* | 6/2011 | Nair et al. ............. 709/203 |
| 2011/0252415 A1 | 10/2011 | Ricci |

FOREIGN PATENT DOCUMENTS

| | | |
|---|---|---|
| WO | WO 2004/105416 | 12/2004 |
| WO | WO 2009/018347 | 2/2009 |
| WO | WO 2009/149063 | 12/2009 |
| WO | WO 2010/003347 | 1/2010 |
| WO | WO 2011/022204 | 2/2011 |

OTHER PUBLICATIONS

Falchuk et al., "Mobile Contextual Mashup Service for IMS," 2nd IEEE Int'l Conference on Internet Multimedia Services Architecture and Applications, Bangalore, Dec. 2008, 6 pages.

Search Report for UK Patent Application No. GB1102676.2, dated Jun. 9, 2011.

Background of the Invention for the above-captioned application filed Jul. 16, 2010 (previously provided).

Official Action with English Translation for China Patent Application No. 201110045626.0, dated Mar. 5, 2014 17 pages.

Official Action with English translation for China Patent Application No. 201110045626.0, dated Nov. 15, 2014 7 pages.

Official Action with English Translation for China Patent Application No. 201110045626.0, dated May 26, 2015 8 pages.

Official Action for UK Patent Application No. GB1102676.2, dated Oct. 14, 2015, 6 pages.

Notice of Registration (with English Translation) for China Patent Application No. 201110045626.0, dated Sep. 28, 2015 5 pages.

* cited by examiner

DEVICE SKINS FOR USER ROLE, CONTEXT, AND FUNCTION AND SUPPORTING SYSTEM MASHUPS

CROSS REFERENCE TO RELATED APPLICATION

The present application claims the benefits of U.S. Provisional Application Ser. No. 61/307,134, filed Feb. 23, 2010, which is incorporated herein by this reference in its entirety.

FIELD

The invention relates generally to communications and particularly to intelligent telecommunication systems.

BACKGROUND

Customizing a user interface for a telephony device and/or application to suit better a user's preferences is well known in the art. Generally, the user customizes the user interface simply by moving icons, setting preferences, and the like. The basic structure and/or features of the device and/or application remains static based on the assumption that at least a portion of the user interface is a one-size-fits-all situation.

The nature of the work done by a given user fundamentally differs from role to role and among users by profession to profession. The user's effectiveness and convenience can be enhanced significantly by analyzing the way a user performs his work and more significantly change the way a device works. For example, a sales professional heavily relies on his contact manager to manage effectively his customer base. He/she further needs to know current product information, availability, and pricing and what key events are upcoming in the short term. By contrast, an engineering professional needs to know the current status of projects and products that she/he is working on and have information ready at hand about what the next deliverable is.

A user may be more functionally driven with regard to the use of a telephony device. For example, one user is a remote services professional and desires a graphical depiction of the architecture that they are working on complete with an overlay of error messages and a palette of choices about what spares exist on site or what unloaded software patches exist. Another user is an agent in a contact center and needs to pull up past orders (e.g., current products owned) and display additions and/or changes implied by a submitted request for proposal. Specialized computers, such as those for specific functions like remote servicing and computing, are not integrated completely for both communications and computing.

Mashups are fast replacing portals as a means for combining and presenting information to a user. A mashup is a Web page or application that uses and combines data, presentation, and/or functionality from two or more sources to create a new service. Mashups are generally client applications or hosted online and can easily and inexpensively produce enriched results using open Application Program Interfaces ("APIs") and data sources in a previously unforeseen or unanticipated manner.

Mashup use is expanding in the business environment. Business mashups are useful for integrating business and data services, as business mashup's technologies provide the ability to develop new integrated services quickly, to combine internal services with external or personalized information, and to make these services tangible to the business user through user-friendly Web browser interfaces. Business mashups differ from consumer mashups primarily in the level of integration with business computing environments, security, and access control features, governance, and the sophistication of the programming tools (mashup editors) used. Another difference between business mashups and consumer mashups is a growing trend of using business mashups in commercial software as a service offering.

Telecommunications have been slow to adopt mashup technologies and Service Oriented Architectures ("SOA") to integrate and make available disparate data as discrete Web services or applications. A company called "Ifbyphone" and others have made use of the concept of a "telecommunications mashup" by linking direct response phone call data with web advertising data and reporting the result via Google Analytics. The Ifbyphone system effectively provides the byproduct data of how effective the web advertising campaign is by jointly displaying the data associated with direct response phone calls. The direct response phone call data is captured by use of a well known system called a voice-based, form filler application. The output of the form filler application is mapped to a specific web advertising campaign such that correlation between the cause (web advertising) and effect (direct response phone call) can be displayed and analyzed via the Google Analytics tool. The logic to combine the web page information with the form filler information and output the combined result into Google Analytics (or any other output display format) is a very simple telecommunications mashup.

Although phone mashups offer a number of benefits, their use has been relatively limited, both in scope and capabilities.

SUMMARY

These and other needs are addressed by the various embodiments and configurations of the present invention. The present invention is directed generally to an intelligent communication system that determines a user role, context, presence, and/or location, such as by monitoring user behavior, and, based on the determined user role, context, presence, and/or location, performs various operations and/or functions.

In one embodiment, a method includes the steps:

(a) determining, by a processor executable mashup stimulus module, one or more of a role, context, presence state, and location of a user, the determined role, context, presence state, and/or location being different from a user request and command to provide an existing, specified mashup; and (b) in response to step (a), providing, by a processor executable mashup management module, one or more of a mashup and output of the mashup to the user, the mashup being a function of the determined role, context, presence state, and/or location.

In another embodiment, an apparatus includes:

(a) a processor executable mashup stimulus module to determine one or more of a role, context, presence state, and location of a user, the determined role, context, presence state, and/or location being different from a user request and command to provide an existing, specified mashup; and (b) a processor executable mashup management module operable, in response to operation (a), to provide a mashup and/or output of the mashup to the user, the mashup being a function of the determined role, context, presence state, and/or location.

In yet another embodiment, a method includes the steps:

(a) determining, by a processor executable mashup stimulus module, one or more of a role, context, presence state, and location of a user;

(b) based on the determined at least one of a role, context, presence state, and location, selecting, by a processor executable mashup selection and/or creation module, a mashup to provide output to the user;

(c) selecting a computational device of the user to receive output from the mashup;

(d) configuring, by a processor executable mashup configuration module, the mashup and/or mashup output based on one or more of capabilities, provisioning, and user preferences of the selected computational device; and (e) providing, by a processor executable mashup management module, the mashup and/or mashup output to the user.

The various embodiments can change mashups and user interface appearance and/or configuration dynamically in response to changing user role, context, presence and/or location, thereby increasing substantially user efficiency and convenience. The user can, for example, receive new mashups and user interface appearances and/or configurations as he/she goes through his/her day from in the office to out of the office, changes computational or communication devices, and/or services different customers or clients. The ability recognizes the reality that the work to be performed by the user profoundly changes the way that the user desires to communicate and enables users to customize their user interfaces and received information in ways that suit their unique likes and dislikes and working styles. The user is able to create an entirely customized (new) service by the mashup. As a result, a single communication device can meet dynamically differing needs of the user.

The embodiments can, by using mashups, provide easy, fast integration, frequently using open APIs and data sources to produce enriching results and new services that were not necessarily the original reason for producing the raw source data. Web-based mashups can enable linking of multiple resources via known APIs. Business mashups can allow integration of complex business and data services without the costly programming normally required.

The embodiments can further use Service Oriented Architectures ("SOA") to integrate disparate data by making them available as discrete Web services. Web services provide open, standardized protocols to provide a unified means of accessing information from a diverse set of platforms (e.g., operating systems, programming languages, and applications). These Web services can be reused to provide completely new services and applications within and across organizations, providing business flexibility.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "call log" refers to a collection, or list, of inbound and/or outbound calls. A call is typically described by timestamp (e.g., date and time of day of call set up, termination, or receipt), call duration, called number, calling number, callee identity, and/or caller identity.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "contact" refers to any voice, text, and/or video electronic communication, such as a voice call, E-mail, instant message, text chat, VoIP call, and the like.

The term "context" refers to the set of facts or circumstances that surround a situation or event. Examples of context include current activity (e.g., working and not working), subject matter, purpose or intent of activity, presence, availability, and the like.

The term "customer" or "client" denotes a party patronizing, serviced by, or otherwise doing business with the enterprise The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "EMML", or Enterprise Mashup Markup Language, is an SML markup language for creating enterprise mashups, which are software applications that consume and mash data from variety of sources, often performing logical or mathematical operations as well as presenting data. Mashed data produced by enterprise mashups are presented in graphical user interfaces as mashlets, widgets, or gadgets.

The term "icon" refers to a small picture or image on a computer display that represents a particular object, operation, or group of files.

The terms "instant message" and "instant messaging" refer to a form of real-time text communication between two or more people, typically based on typed text. The instant message is conveyed by an instant messaging program offered by a service, such as AOL™, MSN Messenger™, Yahoo! Messenger™, Live Messenger™, and Apple's iChat™. Generally included in the instant messaging software is the ability to see the presence of another party; that is, the ability to see whether a chosen friend, co-worker or other selected person (known as a "buddy") is online and connected through the selected service. Instant messaging differs from ordinary e-mail in the immediacy of the message exchange and also makes a continued exchange simpler than sending e-mail back and forth. Instant messaging, unlike e-mail, is also generally stateless. Most exchanges are text-only, though some services now allow voice messaging, file sharing and even video chat (when both users have cameras). For instant messaging to work, both users must be online at the same time and the intended recipient must be willing to accept instant messages. An attempt to send an instant message to someone who is not online (or is offline), or who is not willing to accept instant messages, will result in a notification that the transmission cannot be completed. If the online software is set to accept instant messages, it alerts the recipient with a distinctive sound and provides a window that collectively indicates that an instant message has arrived. The window allows the recipient to accept or reject the incoming instant message. An instant message session is deemed to disconnect, or be disconnected, when the user goes offline, refuses to accept an instant message, or is suspended by the user failing to respond to an instant message after a predetermined period of time after an instant message is sent and/or received. An instant message session is deemed to be reconnected (or a call-back deemed to occur) when the user resumes the instant messaging session, such as by responding to an outstanding instant message.

The term "mashup" refers to a web page or application that uses or combines data or functionality from two or many more external sources to create a new service. To be able to permanently access the data of other services, mashups are generally client applications or hosted online. In the past years, more and more web applications provide Application Programming Interfaces (APIs) that enable software developers to easily integrate data and functions instead of building it themselves. Types of mashups include data mashups (which combine similar types of media and information from multiple sources into a single representation thereby creating a new and distinct web service), consumer mashups (which combines different data types, which are generally visual elements and data from multiple sources), and business mashups (which define applications that combine their own resources, application, and data, with other external web services to focus data into a single presentation and allow for collaborative action among businesses and developers), and enterprise mashups. Two mashup styles are commonly used, namely Web-based and server-based. Whereas web-based mashups typically use the user's Web browser to combine and reformat data, server-based mashups analyze and reformat the data on a remote server and transmit the data to the user's browser in its final form. An example of a mashup is the use of cartographic data to add location information to real estate data, thereby creating a new and distinct Web service that was not originally provided by either source. Another mashup example is a mashup that maps services to display features. In many mashup configurations, the mashup operates as middleware system, or a system that is between the user interface and the database access software.

The term "mashup editor" refers to a tool or platform for building mashups, which allow designers to visually construct mashups by connecting together mashup components. Exemplary mashup editors include Yahoo! Pipes™, IBM's QEDWiki™, and Microsoft's Popfly™.

The term "mashup enabler" refer to a tool for transforming incompatible IT resources into a form that allows them to be easily combined, in order to create a mashup. Mashup enablers allow powerful techniques and tools (such as mashup platforms) for combining data and services to be applied to new kinds of resources. An example of a mashup enabler is a tool for creating an RSS feed from a spreadsheet (which cannot easily be used to create a mashup). Mashup enablers are often part of mashup editors.

The term "metaphor telephone" refers to a communication device that displays a metaphorical depiction of a selected object, such as a device capability, a communication medium, a virtual or geographic location, and the like. An example is where a communication device richly displays a conference by each participating node's communication capabilities and limitations.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "presence" refers to a presence state of a user that informs another that wish to contact the user of his availability and willingness to communicate. Examples of presence include "free for chat", "busy", "away", "do not disturb", "out to lunch", and the like.

The term "presence information" refers to any information associated with a network node and/or endpoint device, such as a communication device, that is in turn associated with a person or identity. A common form of presence information is a status indicator of the user's presence. The status indicator is stored in the user's personal availability record (called presentity) and is made available for other users to convey his availability for communication. Presence information can indicate user status (e.g., online or offline), user availability (e.g., available, busy, on the phone, or out to lunch), user's desired contact means (e.g., instant messaging, circuit-switched telephone, packet-switched telephone, cell phone, pager, etc.) that may vary by contactor identity and/or contact time, and at what endpoint a contactor is most likely to reach successfully the presence service subscriber. Presence information can span a number of different communication channels. The aggregated view of a user's presence (that is, the availability across all of an individual's SIP-enabled devices) is called Multiple Points of Presence or MPOP. Examples of information useful in determining a user's presence and availability include information regarding the accessibility of the endpoint device, the recency of use of the endpoint device by the person, recency of authentication by the person to a network component, recency of registration of an endpoint device, an endpoint publishing presence information, SUBSCRIPTION requests generated by a user agent in the user's endpoint device, geographical location of the user using mobile device location information, scheduled activities on the user's calendar, indications whether or not a user has been reading or sending email, and an indication whether the user's email application has an out of office setting. Present information can be, for example, the electronic address of a device at which the service subscriber is currently deemed to be present and/or available.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "role" refers to a function performed by or position or office of an individual or organization. Examples include engineer, supervisor, employee, consultant, and the like.

The term "skin" refers to the function and/or appearance and/or configuration of a user interface, such as a particular mashup and user interface configuration. Exemplary "functions" refer to one or more of applications, services, operations, materials, browser features (e.g., browser settings, browser favorites, and combinations thereof. Typically, the function is associated with a mashup. Exemplary "appearance" refers to the one or more of the specific set of icons displayed, displayed icon appearance(s) (e.g., color, size, design, and the like), displayed icon arrangement, wall paper, display theme, sounds, display background, screen saver, display color scheme, font size, screen resolution, number, content, and arrangement of open windows, and other settings of user interface parameters. Typically, "appearance" is defined by a user interface configuration.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "VoIP" refers to a family of transmission technologies for delivering packetized voice communications over IP networks such as the Internet or other packet-switched networks, rather than the public switched telephone network (PSTN). Other terms frequently encountered and synonymous with VoIP are IP telephony, Internet telephony, voice over broadband (VoBB), broadband telephony, and broadband phone. Common protocols for VoIP include H.323 and the Session Initiation Protocol.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The disclosure, in various embodiments, provides a system and method to perform a variety of operations discussed in more detail below. One operation is to determine, based on observations of user behavior and other factors, one or more of a current or future role, context, presence, and/or location of a user using a variety of monitoring, analytical, and search mechanisms. The determination can be done, for example, by observing a subscriber's or user's activities, collecting information regarding an incoming or outgoing contact, and the like to determine the probable role, context, presence, and/or location of the subscriber or user. Another operation is to alter dynamically the skin of the communication device based on one or more of the determined role, context, presence and/or location. The skin can be changed dynamically based on temporal factors, location factors, and the like. A user interface alteration, for example, changes a display appearance and/or configuration and/or activates a new set of mash-ups.

The mashup(s) provide the functional support for the dynamic changes to the user interface and their respective ties to the overall system, cloud, or services. Each mashup provides an appropriate structure and data to support the determined role, context, presence, and/or location of the user. For example, where the user is an individual working on the sales of commodities, stocks, bonds, or financial instruments, on a trading floor, the mashup would access the sales person's contact list, trading turret, and/or dealer board and other such information to make the device into a customized, efficient version of the combined communications and computing platform that the user needs. In another example, an engineer is at the office working on a specific program and needs access to drawings, requirements, PERT or GANT chart-type materials, and the like to efficiently do his job. Selection and configuration of the selected mashup(s) consider a number of factors, such as the capabilities of the subscriber's communication device and the user preferences for the mashup. By dynamically changing skins, the communication device can be changed to adapt efficiently to different roles or work of a user, different user contexts, different user situations, and different functions or capabilities of the user.

During an initial set-up of the system, at least one mashup and associated user interface configuration would be provided. Subsequent pairings of a user interface configuration and the underlying mashup would be possible to add in much the same way as applications can be added to a smart phone. If the owner, operator, or vendor of the system provides an application development environment and the appropriate underlying structures, external development of user interface and mashup pairings would be possible.

The mashup can be preconfigured, such as by the user. In this configuration, a mashup template is populated by the located information. In another example, the mashup is configured dynamically based not only on device capabilities and the type and volume of located information but also on observed user behavior in prior mashup interactions.

In one configuration, the architecture includes a mashup stimulus module where the user makes a request of a new mashup via the user interface, mashup selection and creation modules to perform collectively structured and viral variations on link, system, and application discovery to form the mashup, a mashup configuration module to align mashup and user interface capabilities, provisioning, and preferences, and a mashup management module to coordinate and efficiently manage the mashup and its components.

The various embodiments and configurations in this disclosure will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any application in which it is desirable to collect and associate related and temporally changing multimedia information for presentation to a user.

Figure 1:
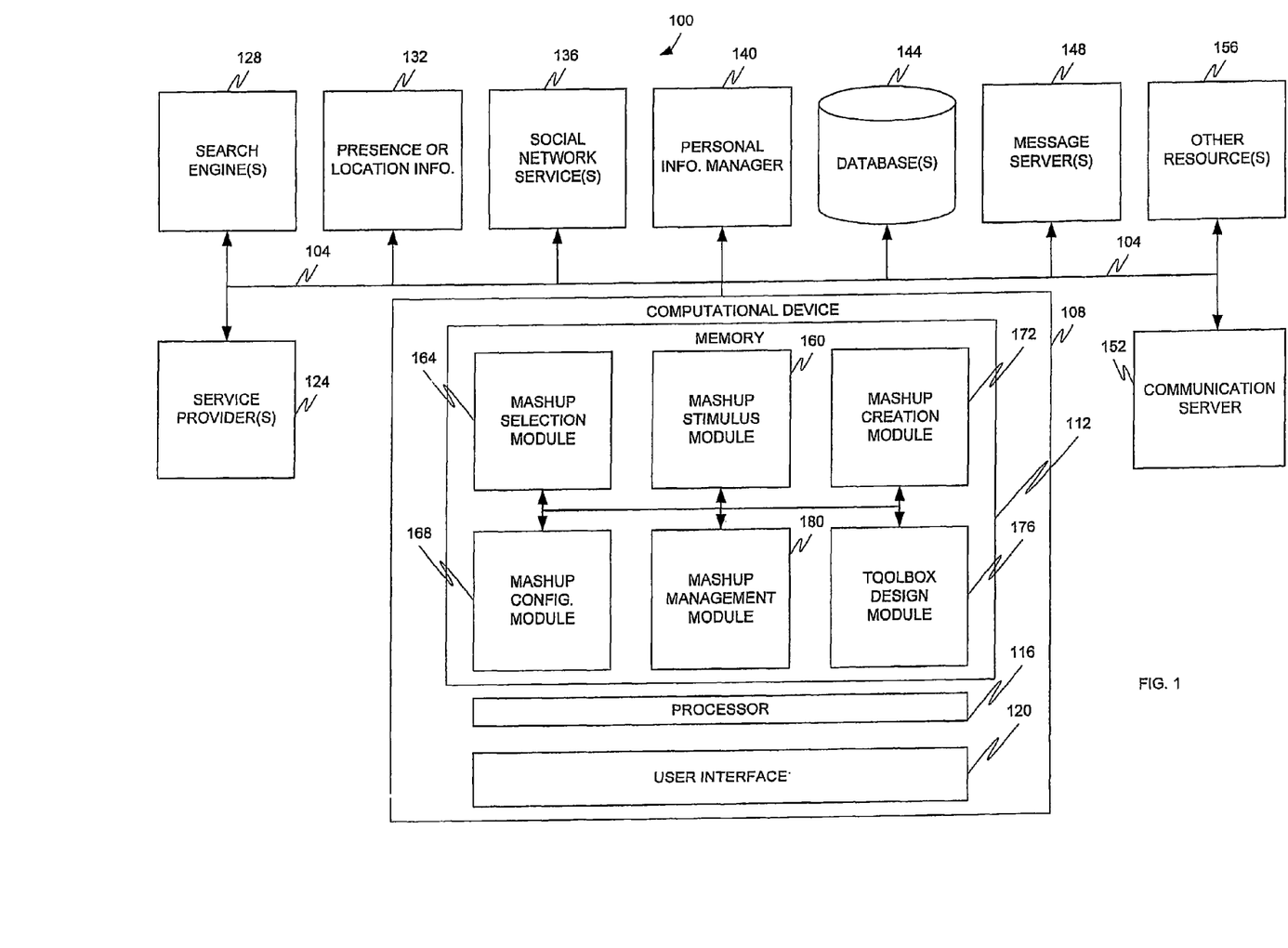
FIG. 1 is a block diagram of a network architecture according to an embodiment.

FIG. 1 depicts an architecture 100 according to an embodiment. Referring to FIG. 1, a network 104 effects communication between a computational device 108 on the one hand and a number of resources on the other.

The network 104 is commonly packet-switched and can be a trusted or untrusted public or private network or combination thereof. Commonly, the network 104 represents a combination of a private internal network and a public external network. In one configuration, the network 104 is a public network supporting the TCP/IP suite of protocols.

The computational device 108 is a software-controlled device that includes a memory 112, processor 116, and a user interface 120. The memory 112 can be any computer-readable medium. The processor 116 can be any suitable central processing unit, with a microprocessor being typical. The user interface 120 can be any suitable user interface, with a graphical user interface being preferred. The graphical user interface offers graphical icons and visual indicators, as opposed to text-based interfaces, typed command labels or text navigation to represent fully the information and actions available to the user. The actions are performed typically through direct manipulation of the graphical elements. The computational device 108 is commonly an IP-enabled, SIP-enabled, digital, and/or analog device. Examples of suitable, modified intelligent IP telephones include the Avaya 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videphone™), and softphones of Avaya, Inc., executing on a computer, such as a laptop or personal computer. Other types of suitable computational devices 108 include, without limitation, cellular phones, analog phones, digital phones, Personal Digital Assistant, etc. In one configuration, the computational device 108 is a metaphor touchscreen-based telephone having feature-rich capabilities in terms of interacting with telephony, computing and other such resources.

The resources include service provider(s) 124, search engines 128, presence or location information service 132, social network service(s) 136, personal information manager 140, database(s) 144, message server(s) 148, communication server 152, and other resource(s) 156.

The service provider(s) 124 is an entity that provides services to other entities. Usually this refers to a business, such as an application service provider, network service provider, Internet service provider, managed service provider, and telecommunication service provider, that provides subscription or web service to other businesses or individuals. Examples of services offered by service providers include Internet access, mobile phone service, and web application hosting.

The search engines 128 search for information or resources on the network 104, including information provided by web accessible resources. The information may consist of web pages, images, information and other types of files. Some search engines also mine data available in databases or open directories. Unlike web directories, which are maintained by human editors, search engines operate algorithmically or are a mixture of algorithmic and human input. Web engines typically operate through the sequential operations of web crawling, indexing, and searching. Exemplary search engines include Yahoo!™, Google™, Internet Explorer™, Bing™, Baidu™, AOL™, and Netscape™ search engines.

The presence or location information service 132 provides one or both of presence information and satellite-based physical location coordinates. A typical presence service includes a presence service (which includes a presence server and an associated presence information database) that may or may not be operated by (or be external to) an enterprise network. The presence server and presence information database collectively track the presence and/or availability of presence service subscribers and/or their computational devices and provide, to requesting entities, current presence information respecting selected presence service subscribers. As will be appreciated, when the presence service is external to an enterprise the presence service subscribers are different from the enterprise subscribers. The location information service operates a space-based global satellite navigation or location system, such as the Global Positioning System, Galileo, Beidou, COMPASS, GLONASS, IRNSS, and QZSS. It provides physical coordinates respecting the location of a tracked entity.

The social network service 136 can be any social internetworking service, including those defined above.

The personal information manager 140 contains, organizes and/or synchronizes subscriber personal information, such as contact information or address books, electronic calendars, personal notes, lists (e.g., task lists), reminders, text message archives, RSS/Atom feeds, alerts, and project management. An exemplary personal information manager 140 is Outlook™ by Microsoft, Inc. An electronic calendar, as will be appreciated, includes scheduled events indexed by date and time.

The database(s) 144 includes enterprise subscriber information, such as name, job title, electronic address information (e.g., telephone number, email address, instant messaging handle, direct dial extension, and the like), subscriber contact lists (e.g., contact name and electronic address information), other employee records, search results, and the like. In one configuration, the enterprise database 144 is configured in accordance with the Lightweight Directory Access Protocol.

The message service(s) 148 refer to any text or voice-based messaging system. In one configuration, the messaging service 148 is a (unified) messaging server that provides features for integrating real-time voice, video, and text communication services, such as instant messaging, chat, telephony (including IP telephony), and video conferencing, with non real-time communication services, such as voice mail, e-mail, SMS, and facsimile.

The communications server 152 can include a PBX, an enterprise switch, an enterprise server, or other type of telecommunications system switch or server. The communication server 152 is preferably configured to execute telecommunication applications such as the Avaya suite of MultiVantage™ or Aura™ applications of Avaya, Inc., including Communication Manager™, Aura Communication Manager™, Avaya IP Office™, and MultiVantage Express™.

The other resource(s) 156 include, for example, any indexed or otherwise searchable information or services available on the network 104. Other resources 156 include information available on web pages, blogs, RSS feeds, and the like.

Included in the memories of the computational device 108 (and/or optionally in the memory of the communication server 152 and/or located in one or more other network nodes on the network 104) are a mashup stimulus module 160, mashup selection module 164, mashup configuration module 168, mashup creation module 172, toolbox design module 176, and mashup management module 180. Typically, the mashups will execute on the communication server 152, which will provide the output to the computational device 108. Virtual machines may be employed to enable the computational device 108 to execute one or more otherwise incompatible mashups.

The mashup stimulus module 160 detects a stimulus that triggers a change of the user interface 120, such as by causing a different user interface 120 appearance and/or configuration and associated mashup to be selected. The stimulus may be the press of a key, selection of an icon, receipt of an oral and/or textual command, input of a destination electronic address, receipt of an incoming contact from an identified contactor (e.g., identified by electronic address, caller ID, and the like), temporal indicator (such as a day-of-week, time-of-day, etc.), electronic calendar entry (such as an Outlook™ electronic calendar entry received from the personal information manager 140), identities of files or records accessed by the user, the content of a user communication (e.g., speech recognition or textual input), and the like. The key press, icon selection, or oral command can request a specific user interface 120 appearance and/or configuration, indicate a mashup configuration type, or request the computational device 108 to create or update a user interface 120 appearance and/or configuration. In one configuration, the mashup stimulus module 160 identifies a change in user role, context, presence and/or location and initiates automatically and dynamically change of the user interface 120, such as by selecting a new and different pairing of mashup and user interface 120 appearance and/or configuration.

User role includes, for example, executive, sales, marketing, engineering, manufacturing, services (e.g., legal, accounting, finance, broker, realtor, medical, emergency, and the like), human resources, security, administrative, supervising, managing, employee, consultant, remote system service, contact center agent, contact center subject matter expert, contact center supervisor, a member with specific duties within a real or virtual social network, sequential process coordination and enforcement, a member with specific assignments within an overall program, data reporting, analysis and/or distribution function, project and/or program management, systems engineering, commodities, stocks, bonds, financial instrument trading, management or advisor, government entity coordination, financial services, personal, business, hobby, religious, interests, family (e.g., role can be non-work related when driven by a use context that is not work related), and combinations thereof.

User context includes, for example, working—in office, working—home office, working—traveling, working—customer site, working—trade show, not working—but available for priority items, not working—but available for certain (specified or important) parties, not working—asleep, not working—vacation, not working—furlough, not working—emergency, sensed user activity, sensed resources (including computational or communication devices, records, files, links (e.g., hyperlinks), RSS feeds, and the like) accessed by or otherwise in use by user, sensed participants in activity involving user, and combinations thereof.

User presence, for example, includes "present—available by contact mode email at address (jimsmith@aol.com)", "present—available for contact for specified parties otherwise not available", "not present and available", and the like.

User location, for example, includes a set of satellite-based position coordinates, a functional location (e.g., home, office, and the like) or location expressed relative to a landmark, geofence location, geopod location, within a controlled access structure, and the like. Such changes can be identified through, for example, observations of user behavior, context, presence and/or location.

The mashup stimulus module 160 can further be configured to observe user behavior and activities and associate stimuli with mashups accessed by the user and/or user interface 120 appearance and/or configuration configured by the user. The mashup stimulus module 160 would typically recommend to the user the association of the observed stimuli with the mashup and/or user interface 120 appearance and/or configuration and update the mashup and/or user interface 120 appearance and/or configuration data structure if approved by the user. For example, the mashup stimulus module 160 would indicate to the user that the last instance of an observed context that the user had accessed a particular mashup and/or user interface 120 appearance and/or configuration and request if the user would like the particular mashup and/or user interface 120 appearance and/or configuration retrieved.

The mashup selection module 164, when a stimulus is detected, locates, identifies, and selects a set of changes to be made to the user interface 120, or a skin for the computational device 108. Useful mashup and/or user interface 120 configuration variations can be requested by the user and discovered by the mashup selection module 164 based on input from the system and/or the existing mashup to create a derivative mashup. In one configuration, the mashup selection module 164 locates, identifies and selects one or more mashups to produce output for presentation to the user via the user interface 120. The mashup selection module 164 can locate, such as by a structured or viral search, existing mashups in (enterprise) database(s) 144 that may already be associated with the current or other users or in other (web accessible) resource(s) 156 that may be associated with or published by parties other than the user. Custom mashups can be created by system support staff. When enough requests are received for a specified mashup, the system support staff would create the new mashup.

The mashup configuration module 168 selects a user interface 120 appearance and/or configuration to be associated with the selected mashup and configures the mashup(s) and their output(s) for presentation, by the user interface 120, to the user. This user interface 120 appearance and/or configuration can be done at the time of the user selecting and configuring the skin in an interactive session. The mashup may be effected by any suitable technique, such as by a mashup enabler. The mashup configuration module 168 not only has the ability to configure mashups and/or mashup output but also to rearrange user interface 120 appearance and/or configuration components as defined by the selected user interface 120 configuration. Rearrangement of the user interface 120 appearance and/or configuration components, for instance, can be selected from a plurality of alternative user interface 120 appearances and/or configurations that the user prefers. In one configuration, the various user interface 120 appearances and/or configurations are associated with identifiers of computational devices 108 of the user. For example, for a specific role, context, presence and/or location, a given mashup and/or user interface 120 appearance and/or configuration would be associated with a specific one of the computational devices 108 of the user. In other words, a given mashup and/or user interface 120 appearance and/or configuration that applies to a selected role, context, presence, and/or location would be varied based on the sensed identity or electronic address of the computational device 108 currently in use by the user.

The particular mashup configuration, mashup output, and user interface 120 appearance and/or configuration presented to the user normally depends on the capabilities or provisioning of or user preferences for the particular computational device 108 of the user. The mashup is adapted by the mashup configuration module 168 to the capabilities, provisioning, and/or user preferences of the computational device 108. In other words, the configuration and content of the mashup display varies depending on the device capabilities, configurations, provisioning and user preferences. For example, the mashup configuration module 168 can re-arrange or alter the screen appearance and/or configuration, e.g., the icons, menus, sounds, and the like, based on the capabilities of the computational device 108, with the same mashup having differing appearances and/or configurations for different computational devices 108. Device capabilities include, for example, screen or display size, CPUs, random access memory capacity, volatile memory capacity, nonvolatile memory capacity, total memory capacity, compatible and/or hosted communication applications, compatible and/or hosted communication clients, operating system, port configurations, wireless communication capabilities, compatible wired and wireless communication and data protocols, codecs, bandwidth, voice capabilities, video capabilities, text capabilities, and Web capabilities.

By way of example, if the computational device 108 has no Web browser capability or provisioning or is otherwise not Web browsing capable the mashup configuration would exclude a Web hyperlink. In another example, the computational device 108 is a full featured voice communication device, such as a Personal Digital Assistant, laptop, or personal computer, and the mashup and its display would include the fully operational mashup and appearance and/or configuration, including the Web hyperlink.

The mashup creation module 172 creates mashup(s) appropriate to the determined user role, context, presence, and/or location. Mashup creation may be fully automated or interactive with the user or administrator and effected by any suitable technique, such as by mashup editor or enabler. The mashup created would include not only the mashup itself and the associated appearance and/or configuration but also the associated stimuli that, when detected, cause the mashup and associated appearance and/or configuration to be selected by the mashup selection module 164. In one configuration, the mashup creation module 172 locates, such as by a structured or viral search, mashup templates in (enterprise) database(s) 144 that may already be associated with the user or other (web accessible) resource(s) 156, which are associated with or published by parties other than the user. The mashup templates are customized to suit the particular needs of the user, such as by selecting the specific services or applications or output to be combined by the mashup template. In another configuration, the mashup to be created is determined based on observing past and present user behavior, user preferences, predetermined templates, and the like.

The toolbox design module 176 is a tool that facilities mashup creation by enabling a user to drag-and-drop icons, links, filenames, file addresses, application identifiers, and other objects into a container for functional association of the objects, operations or groups of files by a mashup. When the objects, operations, or groups of files are received by the toolbox design module 176, the toolbox design module 176 provides them to the mashup creation module 172 for mashup creation.

In one configuration, the mashup is effected by a series of EMML forms. A first form includes first collected information and a second form second collected information. The first and second collected information and control is passed to a third form, which can be a web page hosted on any server, coded in any language, and either secured or unsecured. The web page receives the collected information as a post or retrieves the information in the same manner as an HTML form. The web page presents the information, by the user interface 120, to the user or subscriber. In response to user input, the web page outputs a command, which can be in the form of an XML file, which informs the mashup what to do next. The next step can, for example, initiate a specified communication mode to a specified computational device of a third party, route an incoming call to voice mail, disconnect a previously connected call, and the like.

The mashup management module 180 coordinates and efficiently manages mashup components and oversees the operations of the various other modules. For example, the mashup management module 180 can publish and share a user's mashups to other subscribers or other network 104 users. The operations of the mashup management module 180 will be discussed with a number of configurations.

In one configuration, the mashup management module 180 first determines how to pre-launch applications and/or files before presentation to the user. An example is launching communications and/or informational searches from the mashup display, launching a word processor from a mashup display and retrieving a specific document, launching an electronic spreadsheet from a mashup display and retrieving a specific spreadsheet for display, and the like. The pre-launched applications would be minimized until the mashup management module 180 determines that they are to be maximized for presentation to the user.

In one configuration, the mashup management module 180 pre-fetches the information needed (e.g., credentials, settings, preferences, locations, authentications, and the like) necessary to efficiently launch an application. In other words, the information is prequeued and pregrouped to speed the launch of an application.

In one configuration, the mashup management module 180 determines, based on one or more of role, context, presence, and/or location, that the user is currently at a location or in the presence of one or more parties where client sensitive information can be compromised. Even though the mashup selection module 164 has selected a certain pairing of mashup and user interface 120 appearance and/or configuration, the mashup management module 180 can modify the selection to suppress the display of the sensitive information. When the user is no in danger of compromising the client sensitive information, the mashup management module 180 can cease the suppression and display the sensitive information.

A number of further examples will now illustrate the operations of the various modules.

In a first example, a user receives an incoming call from a caller while the user is on a personal call. The callee decides to take the call and either disconnects the personal call or puts it on hold. The mashup stimulus module 160 compares the telephone address of the incoming call and/or caller identification with the user's contact lists maintained by the personal information manager 140 or with call logs and determines that a user interface 120 reconfiguration is needed based upon its determination that the caller is employed by a customer.

The mashup stimulus module 160 provides the context to the mashup selection module 164 and mashup configuration module 168 for selection and configuration of a suitable mashup and selection of a user interface 120 appearance and/or configuration. The user interface 120, upon connection with the incoming call, displays the selected mashup output and user interface 120 appearance and/or configuration. If the user were a stock broker and the customer his client, the example could produce a display similar to that depicted in FIG. 2 (which is discussed below). In one configuration, the user's wife is placed on hold, and the user interface 120 appearance and/or configuration components associated with the user's wife are minimized while the user interface 120 appearance and/or configuration components associated with the customer are maximized. When the user returns to the wife's call, the user interface 120 appearance and/or display components associated with the user's wife are again maximized and those associated with the customer minimized or deactivated.

In another example, the mashup stimulus module 160 determines, from the user's electronic calendar or user's current physical location, that the user is visiting a customer's facility. Based on this context, the mashup selection module 164 selects a mashup providing customer-specific information and the mashup configuration module 168 selects a specific user interface 120 appearance and/or configuration. For instance, the mashup selection module 164 could provide automatically by a mashup to a service technician real time alarm signals received and being received by a service facility from the customer's enterprise network, profiles of hardware and software in use by the customer, network topology of the customer's facilities, and resources on site at the customer's facility or the nearby service facility to conduct maintenance and/or repair functions. The user interface 120 appearance and/or configuration provided to the service technician user is specific to the customer, the customer's enterprise network, and to the alarms received from the customer's enterprise network.

In another example, the user transfers a call from his desk phone to a personal digital assistant. The transfer is identified by the mashup stimulus module 160. The mashup configuration module 168 determines that the user was receiving, by the desk phone, a specific mashup and associated user interface 120 appearance and/or configuration. The mashup configuration module 168 selects a new user interface 120 appearance and/or configuration based on the capabilities, provisioning, and user preferences of the personal digital assistant.

In another example, first and second parties are simultaneously on a telephone call and instant messaging session on different computational devices 108. These two communication sessions are identified by the mashup stimulus module 160. Upon notification by the mashup stimulus module 160, the mashup selection module 164 selects a mashup to combine the two communication sessions into a single or common user interface 120 appearance and/or configuration. The two communication sessions are transferred, by the mashup, to a common computational device 108 and a user interface 120 appearance and/or configuration would provide the computational device 108 with a virtual keyboard displayed on the user interface 120 of the common computational device 108. This would enable the communicants to converse simultaneously and conveniently by common computational devices 108 at each end of the combined communication sessions.

Figure 2:
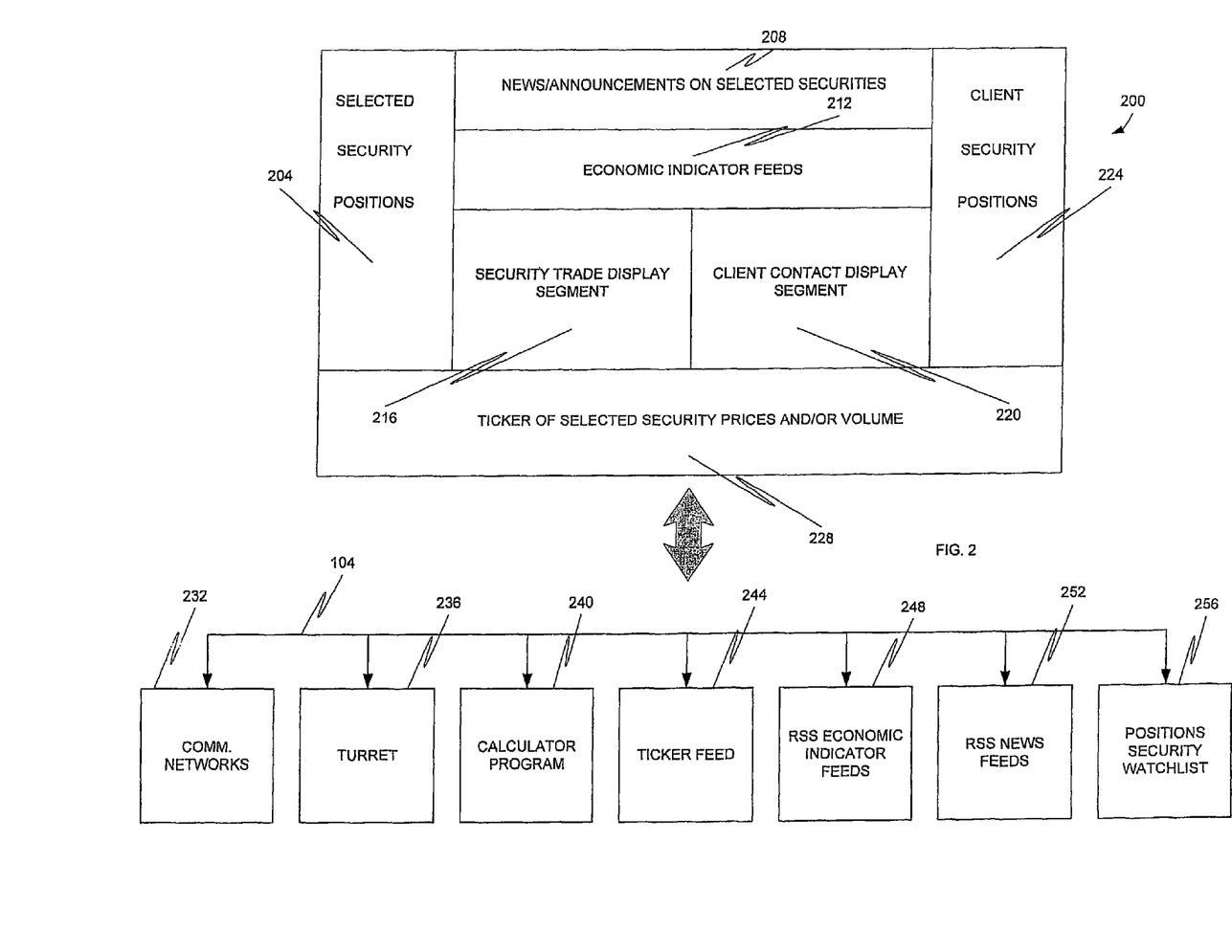
FIG. 2 is a screen shot and related sources according to an embodiment.

Yet another example will be discussed with reference to FIG. 2. The mashup stimulus module 160 sensed role of the user is stock broker and context is that a specific customer has called the user. In response, the mashup selection module 164 has selected one or more mashups that provide(s) the depicted output 200 in the upper half of FIG. 2. The output 200 includes display areas for selected security positions 204 (which are securities being considered for purchase by the customer), (real time) news announcements on the selected securities 208, economic indicator feeds 212 (such as leading, lagging, and coincident indicators for the economy in one or more selected countries that would influence security performance), security trade display segment 216 (to permit the user to effect a buy or sell trade directly from the display), client contact display segment 220 (to permit the user to contact the customer by the same or a different communication mode (e.g., email and instant messaging) directly from the display), client security positions 224 (which are the securities currently held by the customer), and ticker of selected security prices and/or volume 228 (for one or more selected security exchanges, such as the NASDAQ and NYSE). The lower half of FIG. 2 depicts the services and feeds being combined by the one or more mashup(s). The communication networks 232 permit the user to contact the customer by the client contact display segment 220, the financial turret 236 of the stock exchange for the selected security positions 204 to permit trades by way of the security trade display segment 216, a calculator program 240 which takes the customer security positions and multiplies the various positions by the current security price to show, in display segment 224 and relative to the customer's bases in the securities, the performance of the customer's security positions, the ticker feed 244 shows the current value(s) of the selected security positions and/or one more stock exchange indexes (such as the Dow Jones Industrials), Really Simple Syndicate (RSS) economic indicator feeds 248 provide the economic indicator fees 212, the RSS news feeds 252 to provide the news/announcements on the selected securities 208, and finally the positions security watchlist 256 to provide real time data for the selected security positions 204.

To illustrate the impact of the capabilities, provisioning and user preferences on mashup and user interface 120 appearance and/or configuration, assume that the display of FIG. 2 is for a fully functional and intelligent computational device 108 and that the user has a global preference for real time communications with clients, with voice communications being most preferred. Further assume that, consistent with this preference, the client contact display segment 220 is configured for VoIP communications. If the user's presence state changes and he becomes present at a new computational device 108 that is not equipped with VoIP software but is instant messaging capable, the display would be altered to make the client contact display segment 220 an instant messaging interface rather than a voice communications interface.

In yet another example, the computational device 108 is a conventional digital telephone having a key pad. The key pad is overloaded or redefined to perform the different functions as defined by the mashup. For example, the key pad could be redefined to provide an instant message button and an instant message client loaded or otherwise made available to provide instant messaging functionality. Even if the instant message client can not be loaded or executed by the operating system of the computational device 108, the instant message client on a computer associated with the telephone can act as a proxy or intermediate to receive a keyed stream (which could be a DTMF stream) from the telephone, convert it into an equivalent instant message stream, and send the instant message stream on to the third party. When a responsive instant message stream is received from the third party, the computer could convert it into a comprehensible equivalent stream and forward it to the telephone for presentation, by the telephone's display, to the user.

The operation of the architecture 100 will now be discussed with reference to FIGS. 3-4.

Figure 3:
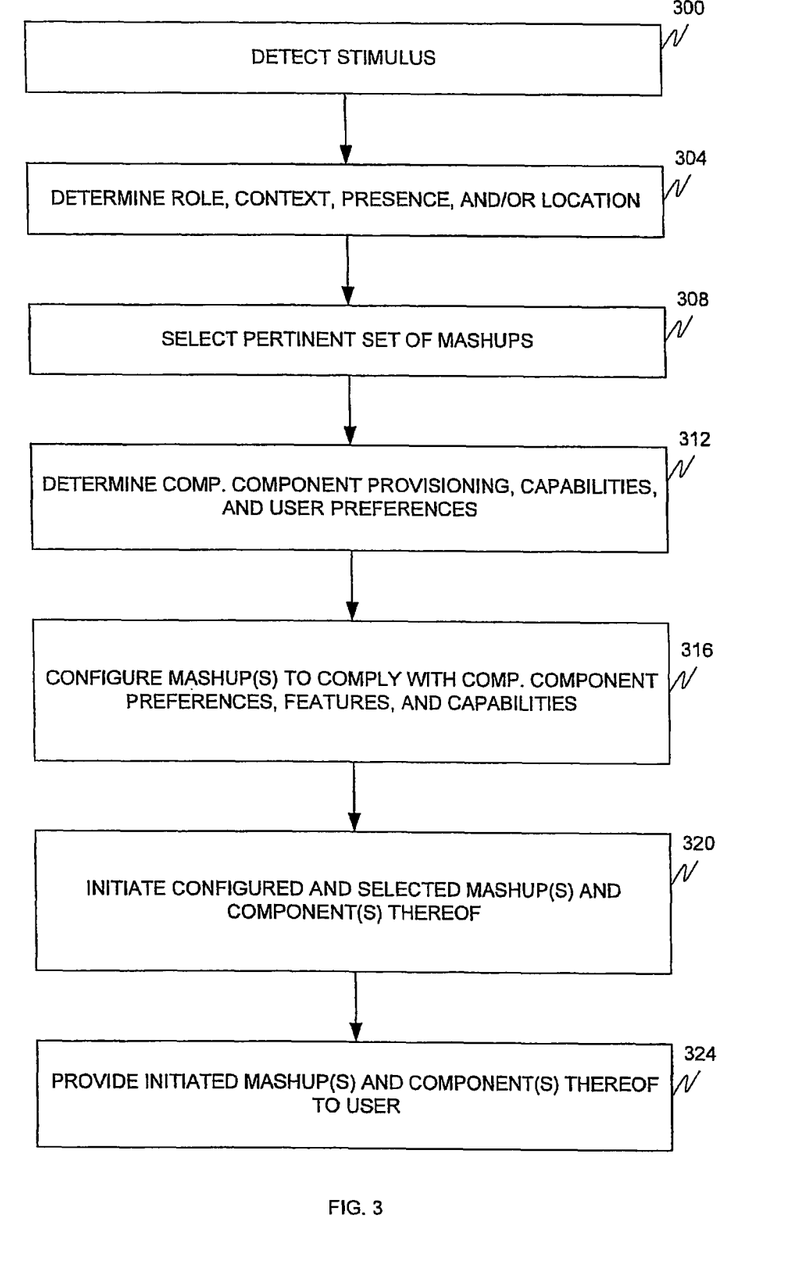
FIG. 3 depicts a flow chart according to an embodiment.

With reference to FIG. 3, the mashup stimulus module 160, in step 300, detects a stimulus that requires presentation of a mashup and/or user interface 120 appearance and/or configuration to a user and, in step 304, determines and describes the role, context, presence, and/or location. The mashup stimulus module 160 provides a suitable notification containing the description to the mashup selection module 164.

In step 308, the mashup selection module 164, assuming that the mashups already are in existence, selects the pertinent set of mashups and provides them and the description to the mashup configuration module 168. If the mashups are not already in existence, the mashup selection module 164 provides the description to the mashup creation module 172 to create the pertinent mashups, which are then provided with the description to the mashup configuration module 168. This step 308 is further discussed with reference to FIG. 4 below.

In steps 312 and 316, the mashup configuration module 168 determines the computational device 108 capabilities, provisioning and/or user preferences and configures the mashup and user interface 120 appearance and/or configuration based on thereon. This step can create a problem where the mashup configuration module 168 is executing on a node other than the computational device 108, such as on the communication server 152. In one configuration, the computational device 108 is controlled by the communication server 152, and the capabilities, provisioning and/or user preferences are maintained by the communication server 152 and therefore readily accessible by the mashup configuration module 168. In one configuration, the mashup configuration module 168 accesses, via a presence service (not shown), presence information 132 indicating the computational device 108 capabilities, provisioning and/or user preferences. In one configuration, the computational device 108 is external to the communication server 152, and the capabilities, provisioning and/or user preferences are discovered by a series of queries. This configuration only works where the computational device 108 is willing to reveal such information to the mashup configuration module 168. In another configuration, the computational device 108 is external to the communication server 152, and the mashup configuration module 168 provides the desired mashup to the computational device 108 so that the computational device 108, which is self-aware of its capabilities, provisioning, and user preferences, can render those parts of the mashup for which it is capable, provisioned, and enabled by user preferences. In one configuration, the mashup configuration module 168 is hosted by the computational device 108 as shown in FIG. 1 and is able to access its capabilities, provisioning, and user preferences from storage. The mashup configuration and user display appearance and/or configuration are typically a function of the type and volume of located information and the device capabilities and can be configured statically or dynamically.

In step 320, the mashup management module 180 initiates the configured and selected mashup(s) and components thereof, including the user interface 120 appearance and/or configuration elements.

In step 324, the mashup management module 180 provides the initiated mashup(s) and component(s) thereof to the user via the user interface 120.

Figure 4:
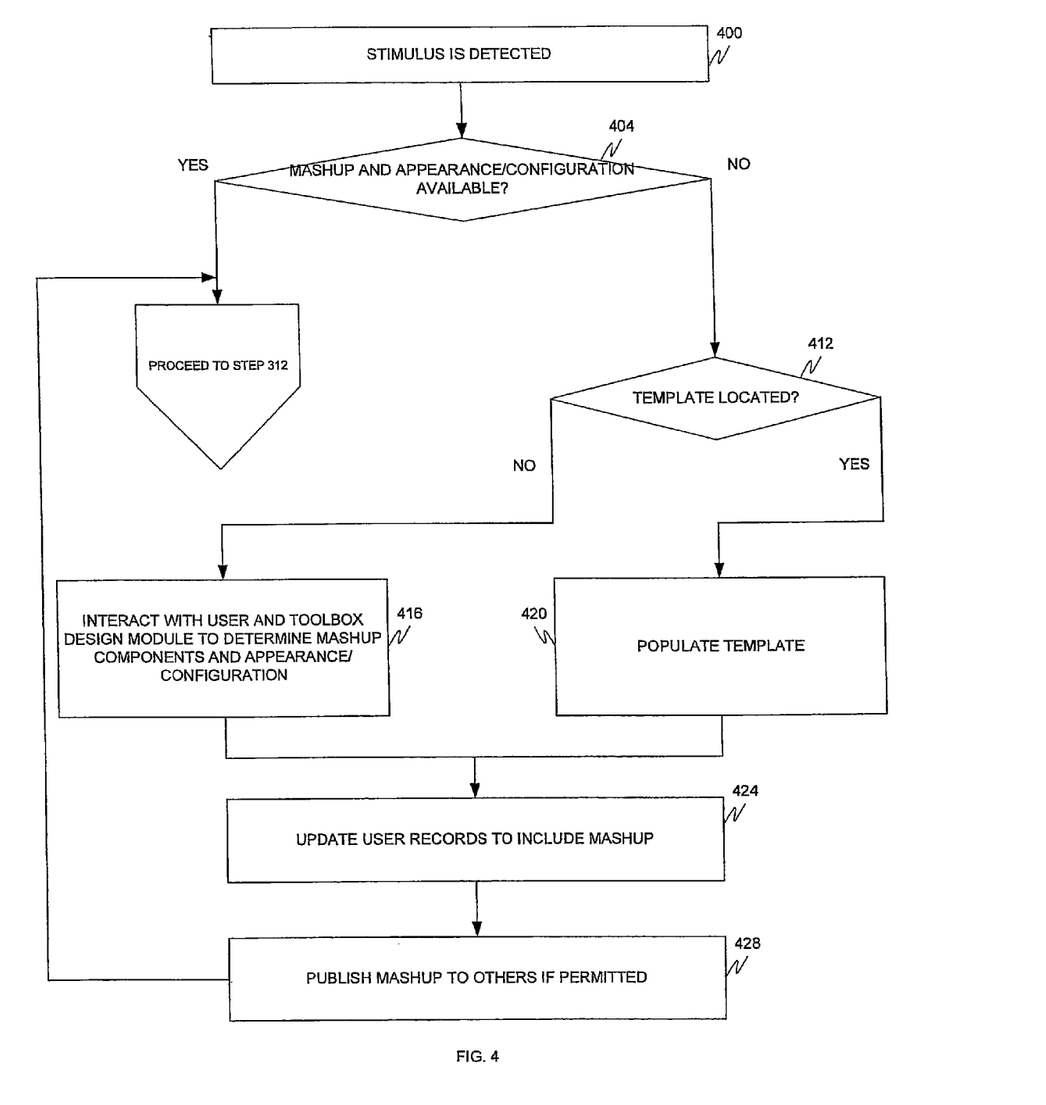
FIG. 4 depicts a flow chart according to an embodiment.

Referring now to FIG. 4, the mashup stimulus module 164, in step 400, has detected a stimulus.

The mashup selection module 164, in decision diamond 404, determines whether or not a mashup and associated user interface 120 appearance and/or configuration are available. If so, the mashup selection module 164 proceeds to step 312. If a mashup and associated user interface 120 appearance and/or configuration are unavailable, the mashup selection module 164 notifies the mashup creation module 172, which performs decision diamond 412.

In decision diamond 412, the mashup creation module 172 determines if a template is available for the mashup. When a mashup template is located, the mashup creation module, in step 420, populates the template. When a mashup template is not located, the mashup creation module 172, in step 416, interacts with the user and the toolbox design module 176 to determine the mashup components and configuration.

After performing either steps 416 or 420, the mashup creation module 172, in step 424, updates user records to include the mashup.

In step 428, the mashup management module 180 determines whether or not to share the mashup and associated appearance and/or configuration with others.

Control is then passed to step 312.

The exemplary systems and methods of this invention have been described in relation to a telecommunication system. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a communication server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications or computational devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention are implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   determining, by a processor executable mashup stimulus module, at least one of a role, context, presence, or location of a user, wherein at least one of the role or context is determined based on a first telephone call and wherein a specified mashup is determined based on an Instant Message session and the first telephone call being simultaneous;
   identifying that the Instant Message session and the first telephone call are on different computational devices; and
   in response to identifying that the Instant Message session and the first telephone call are on different computational devices, transferring the Instant Message session and the first telephone call to a common computational device for displaying the first telephone call and the Instant Message session by using the specified mashup for a user interface of the common computational device.

2. The method of claim 1, wherein the at least one of the role, context, presence, or location is a user role and wherein the user role is one or more of executive, sales, marketing, engineering, manufacturing, services, human resources, security, administrative, supervising, managing, employee, consultant, remote system service, contact center agent, contact center subject matter expert, contact center supervisor, a member with a specific duty within a real and/or virtual social network, sequential process coordination and/ or enforcement, a member with a specific assignment within an overall program, data reporting, analysis and/or distribution function, project and/ or program management, systems engineering, commodity broker, stock broker, bond broker, financial instrument trader, financial services, management, advising, government entity coordination, or realtor.

3. The method of claim 1, wherein the at least one of the role, context, presence, or location is a user context and wherein the user context is one or more of receiving a contact from an identified contactor, a temporal indicator of a scheduled activity, an identity of a file accessed by the user, an identity of a record accessed by the user, content of a communication of the user in a contact with another party, working—in office, working—home office, working—traveling, working—customer site, working—trade show, not working—but available for priority items, not working—but available for certain (specified or important) parties, not working—asleep, not working—vacation, not working—furlough, not working—emergency, sensed user activity, sensed resources accessed by or otherwise in use by user, sensed participants in activity involving user, or combinations thereof.

4. The method of claim 1, wherein the at least one of the role, context, presence, or location is the presence and wherein the presence is a function of a status indicator of the user's presence.

5. The method of claim 1, wherein the at least one of the role, context, presence, or location is a user location and wherein the user location is determined relative to a system of satellite-based location signals.

6. The method of claim 1, wherein the specified mashup is associated with a description of the determined at least one of the role, context, presence, or location, wherein the specified mashup is associated with at least one of (a) a description of device capabilities, provisioning and user preferences required by a computational device of the user, (b) a description of an appearance and/or configuration associated with the computational device of the user, or (c) an electronic address or other identifier of the computational device of the user.

7. A non-transient computer readable medium comprising processor executable instructions that, when executed, perform the steps of claim 1.

8. The method of claim 1, wherein at least one of the different computational devices has a web browser and wherein the at least one of the different computational devices comprises information that comprises a web hyperlink and further comprising:
 determining that the common computational device does not support a web browser; and
 in response to determining that the common computational device does not support the web browser, excluding the web hyperlink on the common computational device.

9. The method of claim 1, wherein the at least one of the role, context, presence, or location is a first user role, wherein the first user role is determined based a first caller of the first telephone call and further comprising:

receiving a second telephone call from a second caller during the first telephone call;
 determining a second user role based on the second caller;
 selecting a second specified mashup based on the second user role;
 placing the first telephone call on hold; and
 in response to placing the first telephone on call, displaying the second selected mashup.

10. An apparatus, comprising:
 a mashup stimulus module that comprises a processor to determine at least one of a role, context, presence, or location of a user, wherein at least one of the role or context is determined based on a telephone call and wherein a specified mashup is determined based on an Instant Message session and the telephone call occurring simultaneously; and
 a mashup management module that comprises the processor, wherein the mashup management module identifies that the Instant Message session and the telephone call are on different computational devices, in response to identifying that the Instant Message session and the telephone call are on different computational devices, transfers the Instant Message session and the telephone call to a common computational device for displaying the telephone call and the Instant Message session by using the specified mashup for a user interface of the common computational device.

11. The apparatus of claim 10, wherein the at least one of the role, context, presence, or location is a user role and wherein the user role is one or more of executive, sales, marketing, engineering, manufacturing, services, human resources, security, administrative, supervising, managing, employee, consultant, remote system service, contact center agent, contact center subject matter expert, contact center supervisor, a member with a specific duty within a real and/or virtual social network, sequential process coordination and/ or enforcement, a member with a specific assignment within an overall program, data reporting, analysis and/or distribution function, project and/ or program management, systems engineering, commodity broker, stock broker, bond broker, financial instrument trader, management, advising, government entity coordination, or realtor.

12. The apparatus of claim 10, wherein the at least one of the role, context, presence, or location is a user context and wherein the user context is one or more of receiving a contact from an identified contactor, a temporal indicator of a scheduled activity, an identity of a file accessed by the user, an identity of a record accessed by the user, content of a communication of the user in a contact with another party, working—in office, working—home office, working—traveling, working—customer site, working—trade show, not working—but available for priority items, not working—but available for certain (specified or important) parties, not working—asleep, not working—vacation, not working—furlough, not working—emergency, sensed user activity, sensed resources accessed by or otherwise in use by user, sensed participants in activity involving user, or combinations thereof.

13. The apparatus of claim 10, wherein the at least one of the role, context, presence, or location is the presence state and wherein the presence state is a function of a status indicator of the user's presence.

14. The apparatus of claim 10, wherein the specified mashup is associated with a description of the determined at least one of the role, context, presence, or location, wherein the specified mashup is associated with at least one of (a) a description of device capabilities, provisioning and user preferences required by a computational device of the user, (b) a description of an appearance and/or configuration associated with the computational device of the user, or (c) an electronic address or other identifier of the computational device of the user.

15. A method, comprising:
  determining, by a processor executable mashup stimulus module, at least one of a role, context, presence, or location of a user, wherein at least one of the role or context is determined based on a telephone call;
  based on the determined at least one of the role, context, presence, or location, selecting, by at least one of a processor executable mashup selection or creation module, a specified mashup to provide output to the user, wherein the specified mashup is selected based on an Instant Message session and the telephone call occurring simultaneously;
  identifying that the Instant Message session and the telephone call are on different computational devices;
  in response to identifying that the Instant Message session and the telephone call are on different computational devices, transferring the Instant Message session and the telephone call to a common computational device for displaying the telephone call and the Instant Message session on the common computational device;
  configuring, by a processor executable mashup configuration module, the specified mashup based on one or more of capabilities, provisioning, or user preferences of the common computational device; and
  providing, by a processor executable mashup management module, the specified mashup to the user.

16. The method of claim 15, wherein the at least one of the role, context, presence, or location is a user role and wherein the user role is one or more of executive, sales, marketing, engineering, manufacturing, services, human resources, security, administrative, supervising, managing, employee, consultant, remote system service, contact center agent, contact center subject matter expert, contact center supervisor, a member with a specific duty within a real and/or virtual social network, sequential process coordination and/or enforcement, a member with a specific assignment within an overall program, data reporting, analysis and/or distribution function, project and/or program management, systems engineering, commodity broker, stock broker, bond broker, financial instrument trader, management, advising, government entity coordination, or realtor.

17. The method of claim 15, wherein the at least one of the role, context, presence, or location is a user context and wherein the user context is one or more of receiving a contact from an identified contactor, a temporal indicator of a scheduled activity, an identity of a file accessed by the user, an identity of a record accessed by the user, content of a communication of the user in a contact with another party, working—in office, working—home office, working—traveling, working—customer site, working—trade show, not working—but available for priority items, not working—but available for certain (specified or important) parties, not working—asleep, not working—vacation, not working—furlough, not working—emergency, sensed user activity, sensed resources accessed by or otherwise in use by user, sensed participants in activity involving user, or combinations thereof.

18. The method of claim 15, wherein the at least one of the role, context, presence, or location is the presence and wherein the presence is a function of a status indicator of the user's presence.

19. The method of claim 15, wherein the specified mashup is associated with a description of the determined at least one of the role, context, presence, or location, wherein the specified mashup is associated with at least one of (a) a description of device capabilities, provisioning and user preferences required by a computational device of the user, (b) a description of an appearance and/or configuration associated with the computational device of the user, or (c) an electronic address or other identifier of the computational device of the user.

20. A non-transient computer readable medium comprising processor executable instructions that, when executed, perform the steps of claim 15.

* * * * *